United States Patent
Nicholson et al.

(10) Patent No.: US 11,650,628 B1
(45) Date of Patent: May 16, 2023

(54) DISPLAY CASE DOOR WITH TOUCH SCREEN

(71) Applicant: Anthony, Inc., Sylmar, CA (US)

(72) Inventors: Jeffery W. Nicholson, Palmdale, CA (US); Pedro Almaguer, North Hills, CA (US); Mark Sandnes, Granada Hills, CA (US)

(73) Assignee: Anthony, Inc., Sylmar, CA (US)

( * ) Notice: Subject to any disclaimer, the term of this patent is extended or adjusted under 35 U.S.C. 154(b) by 0 days.

(21) Appl. No.: 16/591,021

(22) Filed: Oct. 2, 2019

Related U.S. Application Data

(60) Provisional application No. 62/740,915, filed on Oct. 3, 2018.

(51) Int. Cl.
*G06F 1/16* (2006.01)
*G06F 3/044* (2006.01)
*G07F 9/02* (2006.01)
*F25D 23/02* (2006.01)

(52) U.S. Cl.
CPC ......... *G06F 1/1637* (2013.01); *F25D 23/028* (2013.01); *G06F 3/044* (2013.01); *G07F 9/023* (2013.01)

(58) Field of Classification Search
CPC ......... G06F 1/1637; G06F 3/044; G07F 9/023
See application file for complete search history.

(56) References Cited

U.S. PATENT DOCUMENTS

| | | | | |
|---|---|---|---|---|
| 4,936,106 | A * | 6/1990 | Beach, Jr. | F25D 29/005 62/131 |
| 5,191,736 | A * | 3/1993 | Iino | A47F 3/043 49/504 |
| 7,670,018 | B2 * | 3/2010 | Kim | F25D 27/005 362/267 |
| 8,683,745 | B2 * | 4/2014 | Artwohl | G09F 23/0058 49/70 |
| 8,976,158 | B2 * | 3/2015 | Eriksson | G06F 3/0428 345/175 |
| 9,052,536 | B2 * | 6/2015 | Artwohl | A47F 10/02 |
| 9,664,435 | B2 * | 5/2017 | Sung | F25D 23/02 |
| 9,687,087 | B1 * | 6/2017 | Artwohl | A47F 11/10 |
| 9,689,603 | B2 * | 6/2017 | Roh | F25D 23/028 |
| 9,710,992 | B2 * | 7/2017 | Borra | G07F 11/00 |
| 9,972,284 | B2 * | 5/2018 | Lee | G06V 20/20 |
| 10,039,390 | B2 * | 8/2018 | Artwohl | B32B 17/10174 |
| 10,115,286 | B2 | 10/2018 | Kim | |

(Continued)

FOREIGN PATENT DOCUMENTS

| DE | 102009033087 | 2/2011 |
|---|---|---|
| DE | 102013216759 | 2/2015 |

(Continued)

*Primary Examiner* — Rockshana D Chowdhury
*Assistant Examiner* — Douglas R Burtner
(74) *Attorney, Agent, or Firm* — Fish & Richardson P.C.

(57) ABSTRACT

In one general aspect, the subject matter described in this specification can be embodied in a display case door that includes a panel assembly, a door frame, an electronic display, and a touchscreen. The door frame extends about and secured to a peripheral edge of the panel assembly. The electronic display overlays the panel assembly and is secured to the door frame. The touch screen overlaps a first portion of the electronic display, and the display includes a second portion which is not overlapped by the touchscreen.

18 Claims, 4 Drawing Sheets

(56) References Cited

U.S. PATENT DOCUMENTS

| | | | |
|---|---|---|---|
| 10,119,751 B2* | 11/2018 | Choi | G03B 29/00 |
| 10,174,994 B2* | 1/2019 | Kim | F25D 29/005 |
| 10,215,993 B2* | 2/2019 | Seung | G02B 27/144 |
| 10,228,182 B2* | 3/2019 | Choi | B29C 44/588 |
| 10,285,513 B2* | 5/2019 | Lee | F25D 27/00 |
| 10,429,126 B2* | 10/2019 | Park | F25D 23/028 |
| RE48,115 E* | 7/2020 | Artwohl | A47F 3/001 |
| 10,769,666 B2* | 9/2020 | Avakian | G06Q 10/087 |
| 11,419,434 B1 | 8/2022 | Artwohl et al. | |
| 2006/0238517 A1* | 10/2006 | King | G06F 1/1637 |
| | | | 345/173 |
| 2010/0333006 A1* | 12/2010 | Ostergard | G06F 1/3265 |
| | | | 715/768 |
| 2012/0127696 A1 | 5/2012 | Glovatsky | |
| 2014/0078407 A1* | 3/2014 | Green | A47F 3/043 |
| | | | 348/836 |
| 2014/0232958 A1* | 8/2014 | Venturas | G02F 1/133308 |
| | | | 349/12 |
| 2015/0161871 A1 | 6/2015 | Kim | |
| 2015/0192352 A1* | 7/2015 | Sung | F25D 23/028 |
| | | | 29/890.035 |
| 2015/0216326 A1* | 8/2015 | Artwohl | A47F 3/005 |
| | | | 345/173 |
| 2016/0182868 A1 | 6/2016 | Izawa et al. | |
| 2016/0223250 A1 | 8/2016 | Kang et al. | |
| 2017/0205138 A1* | 7/2017 | Hwang | G06Q 10/087 |
| 2017/0234602 A1 | 8/2017 | Seo et al. | |
| 2018/0216830 A1 | 8/2018 | Ivanovic et al. | |
| 2019/0121461 A1 | 4/2019 | Recio et al. | |
| 2019/0122263 A1* | 4/2019 | Avakian | G06Q 10/087 |
| 2019/0383550 A1 | 12/2019 | Miedema | |
| 2021/0048935 A1* | 2/2021 | Lee | H03K 17/962 |

FOREIGN PATENT DOCUMENTS

| | | |
|---|---|---|
| EP | 3059535 | 8/2016 |
| WO | WO 2016062441 | 4/2016 |

* cited by examiner

DISPLAY CASE DOOR WITH TOUCH SCREEN

CROSS-REFERENCE TO RELATED APPLICATION

This application claims priority under 35 U.S.C. § 119 to U.S. Application Ser. No. 62/740,915, filed on Oct. 3, 2018, and entitled "Display Case Door with Touch Screen," the entire contents of which is incorporated by reference herein.

TECHNICAL FIELD

This invention generally relates to display case doors.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more thermally insulated doors or windows for viewing and accessing refrigerated or frozen objects within a temperature-controlled space. Doors for refrigerated enclosures generally include thermally insulated glass panel assemblies.

Displaying content on an electronic display attached to a refrigerated display case doors can be an effective way of advertising products. Allowing a customer to interact with the content displayed in the electronic display can improve the effectiveness of the displayed content. Improvements in the methods for displaying content in refrigerated display case doors is sought.

SUMMARY

In a general aspect, the subject matter described in this specification can be embodied in a display case door that includes a panel assembly, a door frame, an electronic display, and a touchscreen. The door frame extends about and secured to a peripheral edge of the panel assembly. The electronic display overlays the panel assembly and is secured to the door frame. The touch screen overlaps a first portion of the electronic display, and the display includes a second portion which is not overlapped by the touchscreen.

In some implementations, the touch screen includes a coupling interface configured to couple to a portion of the display case door.

In some implementations, the touch screen extends laterally from one vertical edge of the electronic display to another vertical edge of the electronic display.

In some implementations, the touch screen includes a capacitive touch screen.

In some implementations, the door further includes a bezel cover secured to a housing of the electronic display to cover the housing of the electronic display.

In some implementations, the bezel cover includes the touch screen.

In some implementations, the door further includes a computer electrically coupled to the touch screen and electrically coupled to the electronic display, the computer configured to receive and process signals from the touch screen and send instructions associated with the received signals to the electronic display.

In some implementations, the door further includes a retainer secured to the door frame and has an end that engages the electronic display to secure the electronic display to the door frame.

In some implementations, the door further includes a power cable disposed within a channel in a portion of the door frame to provide electrical power to the electronic display.

In some implementations, the door frame includes a hinge that includes an electrical connector, and the power cable extends away from the hinge through the channel in the portion of the door frame.

In another general aspect, the subject matter described in this specification can be embodied in a display case door that includes a panel assembly, a door frame extending about and secured to a peripheral edge of the panel assembly, an electronic display overlaying the panel assembly and secured to the door frame, and a localized touch screen overlaying the electronic display and extending laterally from one end of the electronic display to another end of the electronic display and extending vertically over only a portion of the electronic display.

In another general aspect, the subject matter described in this specification can be embodied in a display case door that includes a panel assembly, a door frame extending about and secured to a peripheral edge of the panel assembly, a door handle coupled to the door frame, an electronic display overlaying the panel assembly and secured to the door frame, and a power cable disposed within a channel in a portion of the door frame and configured to provide electrical power to the electronic display. The door also includes a bezel cover secured to a housing of the electronic display to cover the housing of the electronic display, the bezel cover including a localized touch screen overlaying the electronic display, the localized touch screen extending laterally from one end of the electronic display to another end of the electronic display and extending vertically over only a portion of the electronic display. The door also includes a computer electrically coupled to the touch screen and electrically coupled to the electronic display. The computer is configured to receive and process signals from the touch screen and send instructions associated with the received signals to the electronic display.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
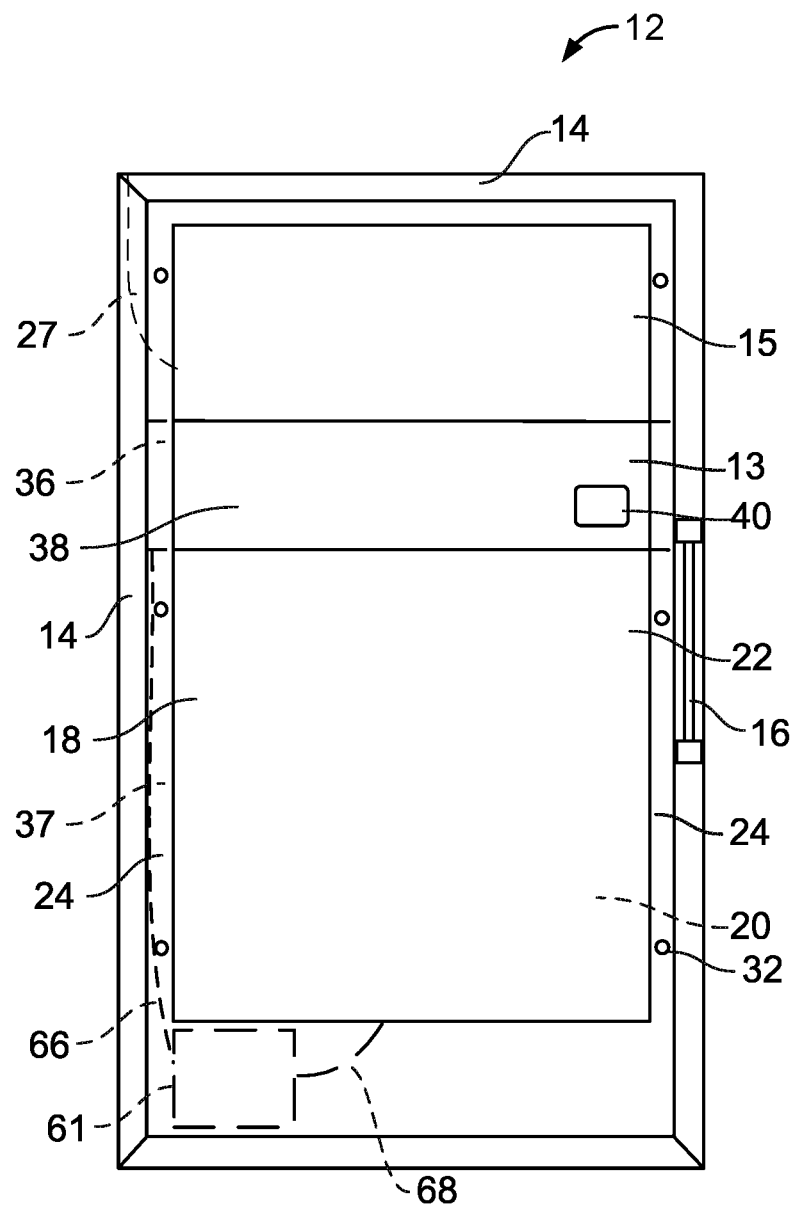
FIG. 1 is a front view of an exemplary display case door according to implementations of the present disclosure.

FIG. 1 illustrates an example implementation of a display case door 12. Display case door 12 includes a panel assembly 20, a door frame 14, an electronic display 18 with a touch screen 13, a bezel cover 24, and a door handle 16. The door frame 14 extends about and is secured to a peripheral edge 44 (shown in FIG. 3) of the panel assembly 20. The electronic display 18 overlays panel assembly 20 and is secured to door frame 14 by one or more retainers (shown in FIG. 4). Touch screen 13 is disposed over electronic display 18 to cover only a local portion of electronic display 18. As further described in detail with respect to FIG. 4, touch screen 13 has a coupling interface 36 configured to couple the touch screen 13 to an outer housing 37 of the electronic display or to bezel cover 24. Bezel cover 24 covers the outer housing 37 (shown in more detail in FIG. 4) of the electronic display 18 and at least a portion of the retainers. Display case door 12 can alternatively be absent of the bezel cover 24, with the outer housing 37 of electronic displays 18 exposed.

Touch screen 13 is a localized touch screen that only covers a portion of the display 18. For example, touch screen 13 can that extend laterally across an entire width of electronic display 18, and extends only across a portion of the length (e.g., in a height direction) of electronic display 18. For example, localized touch screen 13 extends from one vertical edge of the electronic display 18 to another vertical edge of the electronic display 18, overlaying only a front portion of electronic display 18. In some examples, the localized touch screen 13 overlays an upper portion of the display 18, leaving a lower portion of the display 18 uncovered by the touch screen 13. For example, the touch screen 13 can be positioned to overlay a portion of the display 18 that is above a mid-point of the display 18 (e.g., the touch screen 13 can be positioned within an upper-half of the display 18). In some examples, the touch screen 13 can be positioned and sized to overlay an entire portion (e.g., an upper-half, upper-third, or upper-two-thirds) of the display 18. For instance, the touch screen 13 may be positioned only in an upper portion of the display to prevent or reduce inadvertent touchscreen input from young children and/or contact by a shopping cart.

Coupling interface 36 can include an opaque edge (shown in FIG. 4) that extends across each vertical side of the touch screen 13. As further discussed in detail below with respect to FIGS. 4 and 5, coupling interface 36 can be secured to an edge of the outer housing 37 of the electronic display, to the screen of the electronic display, or to the bezel cover 24. Coupling interface 36 includes circuitry (not shown) covered by the opaque edge. For example, touch screen 13 can be a capacitive touch screen that includes a touch sensor 38 (e.g., a glass cover with arrays of electrodes) connected to the circuit boards (each circuit board mounted to a back side of the opaque edges of the coupling interface) that are electrically connected to a computer 61 by a data cable 66. Computer 61 is also electrically coupled to electronic display 18 by a data cable 68. In some implementations, cables 66 and 68 are power cables, data cable, or both. Computer 61 is configured to receive and process signals received from touch screen 13 and send instructions associated with the received signals to electronic display 18. The entire area of the touch sensor 38 is configured and active to receive input from touch. For example, electronic display 18 can display one or more buttons 40 (e.g., an icon or a menu bar) in any area of the display overplayed by touch screen 13. When a user standing in front of the display case door 12 touches an area of touch screen 13 that is above button 40, the touch screen 13 sends a signal to the computer 61 which is then processed by the computer to communicate to electronic display 18 the instructions associated with the touched area (e.g., instruction to open the menu bar).

Door frame 14 includes an internal channel (e.g., as shown and described in reference to FIG. 4) configured to receive and cover power cable 27 that provides power to electronic display 18. Power cable 27 can further provide power to other electronic components of the display case door 12, such as to computer 61, or cameras or LED lights (not shown). Power cable 27 extends from a power source (not shown) that can be external to display case door 12. As further described in detail with respect to FIG. 2, power cable 27 can enter display case door through an aperture or door hinge to connect to electronic display.

Bezel cover is attached to the outer casing of the display case door by mechanical fasteners 32 or an adhesive. In some implementations, bezel cover 24 is a thin plastic frame that covers only the outer housing 37 of the electronic display. In some implementations, bezel cover 24 can additionally cover the door frame 14 of display case door 12.

Still referring to FIG. 1, door handle 16 is attached to door frame 14. Handle 16 can be attached to door frame 14 by using mechanical fasteners or an adhesive or epoxy. Handle 16 may be used to open, close, lock, unlock, seal, unseal, or otherwise operate display case door 12. Handle 16 can be machined from extruded aluminum tubes that are cut to a specified dimension and coupled to form the handle that is secured to a front surface of display case door 12.

Electronic display 18 can be a custom-sized electronic display that overlays an entire area of panel assembly 20. In some implementations, more than one electronic display can overlay the panel assembly 20. As discussed in more detail below with respect to FIG. 3, electronic display 18 includes an outer housing 37 that is covered by bezel cover 24, and an electronically controllable display panel 22 (e.g., screen) mounted to outer housing 37. Display panel 22 is exposed while outer housing 37 is covered by bezel 24 for safety and aesthetic purposes. Outer housing 37 can be positioned directly against the front surface of panel 20. In some examples, a protecting foam or flexible tape (see FIG. 4) can separate outer housing 37 from the front surface of panel 20. Electronic display 18 can include, but is not limited to, liquid crystal displays (LCD), light emitting diode (LED) displays, organic light emitting diode (OLED) displays, field emission displays (FED), plasma display panels (PDP), or electroluminescent (EL) displays. For example, electronic display 18 can be a smart television with streaming capabilities for receiving content over a wireless network (e.g., a WiFi network).

Figure 2:
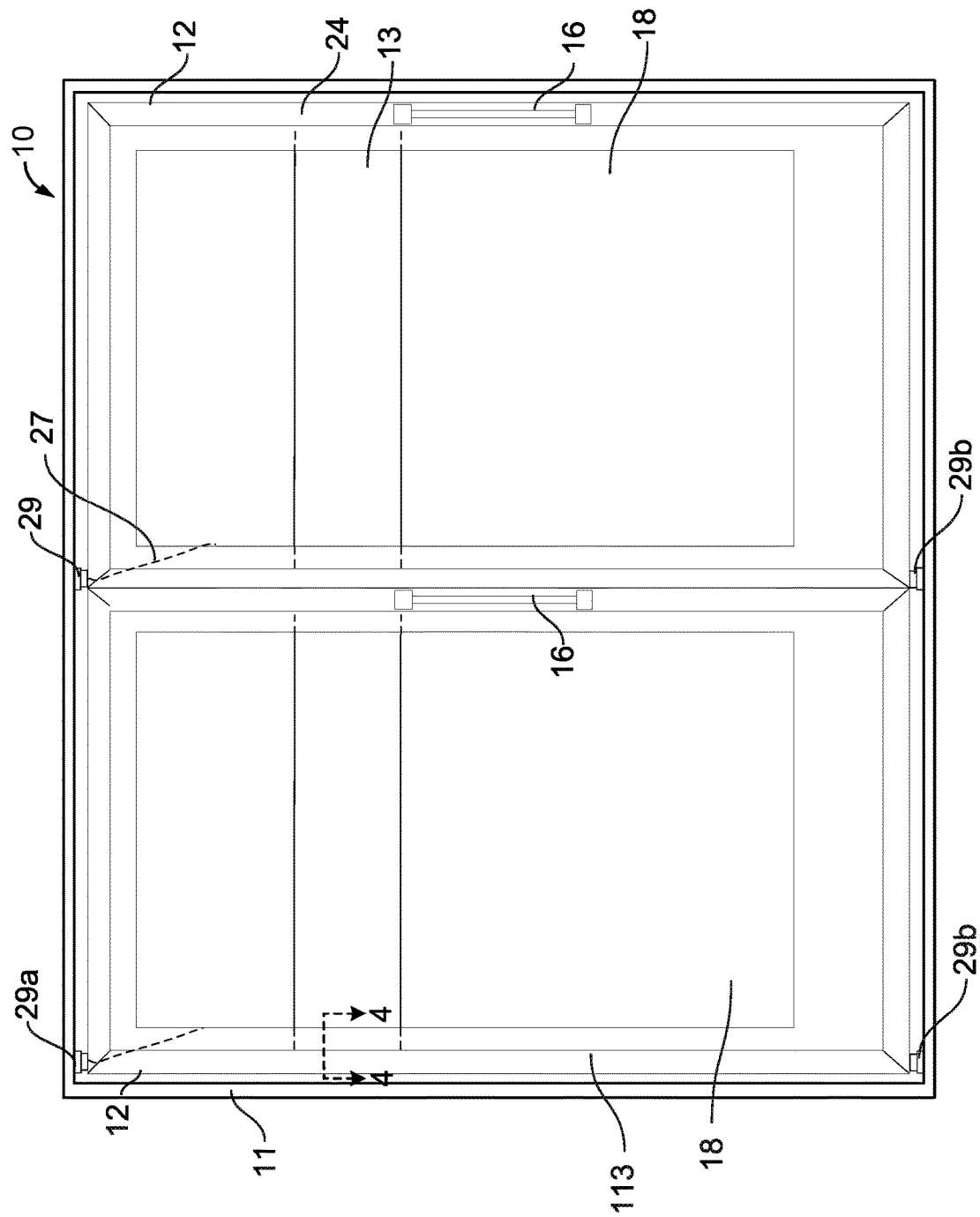
FIG. 2 is a front view of two exemplary display case doors mounted on a display case according to implementations of the present disclosure.

FIG. 2 illustrates an exemplary display case door assembly 10 installed in a refrigerated display case 11. Display case door assembly 10 includes two display case doors 12 pivotally mounted on display case 11 by door hinges 29. The refrigerated display case 11 may be a refrigerator, freezer, or other enclosure defining a temperature-controlled space. For example, refrigerated display case 11 may be a refrigerated display case or refrigerated merchandiser in grocery stores, supermarkets, convenience stores, florist shops, and/or other commercial settings to store and display temperature-sensitive consumer goods (e.g., food products and the like). Refrigerated display case 11 can be used to display products that must be stored at relatively low temperatures and can include shelves, glass doors, and/or glass walls to permit viewing of the products supported by the shelves. In some implementations, refrigerated display case 11 is a refrigerated display unit used, for example, in warehouses, restaurants, and lounges. For example, refrigerated display case 11 can be a free-standing unit or "built-in" unit that forms a part of the building in which the refrigerated display case 11 is located.

The door frame 14 of each display case door 12 includes a hinge 113 with top and bottom openings (not shown) that receive hinges 29 (e.g., pin hinges) for pivotally mounting doors 12 on display case 11. In some examples, the hinge 113 can be a knuckle hinge, a ball bearing hinge, or a hinge rail. For example, a hinge rail 113 can be pivotally connected to a hinge 29a attached to the frame of case 100, where the hinge 29a is inserted into a top opening of the hinge rail 113. Top hinge 29a can be an electrical hinge from which one or more power cables 27, data cables, or power/data cables (e.g., USB cables) extend. For example, hinge 29a can include an aperture to permit the power and data cables (e.g., cables extending from an external power source) to pass through into the door frame channel. In some implementations, hinge 29a can include an electrical connector (not shown) from which each power cable 27 extends. In some examples, the electrical connector includes a 120V frame plug. In some implementations, hinge 29 can additionally include a separate data cable contact. In some implementations, bottom hinges 29b can be gravity hinges and the top hinges 29a electrical hinges.

In some examples, other electrical cables can extend from hinge 29a. For example, panel assembly 20 may include an anti-condensation system that requires power for heating the panel assembly 20 (e.g., providing power to an electro-conductive coating), in which additional electrical conductors may provide such power. In some cases, instead of hinges 29, the display case door can be mounted to case 11 using any type of appropriate hinges such as knuckle hinges or ball bearing hinges. In some implementations, doors 12 can be sliding doors configured to open and close by sliding with respect to the case frame.

Figure 3:
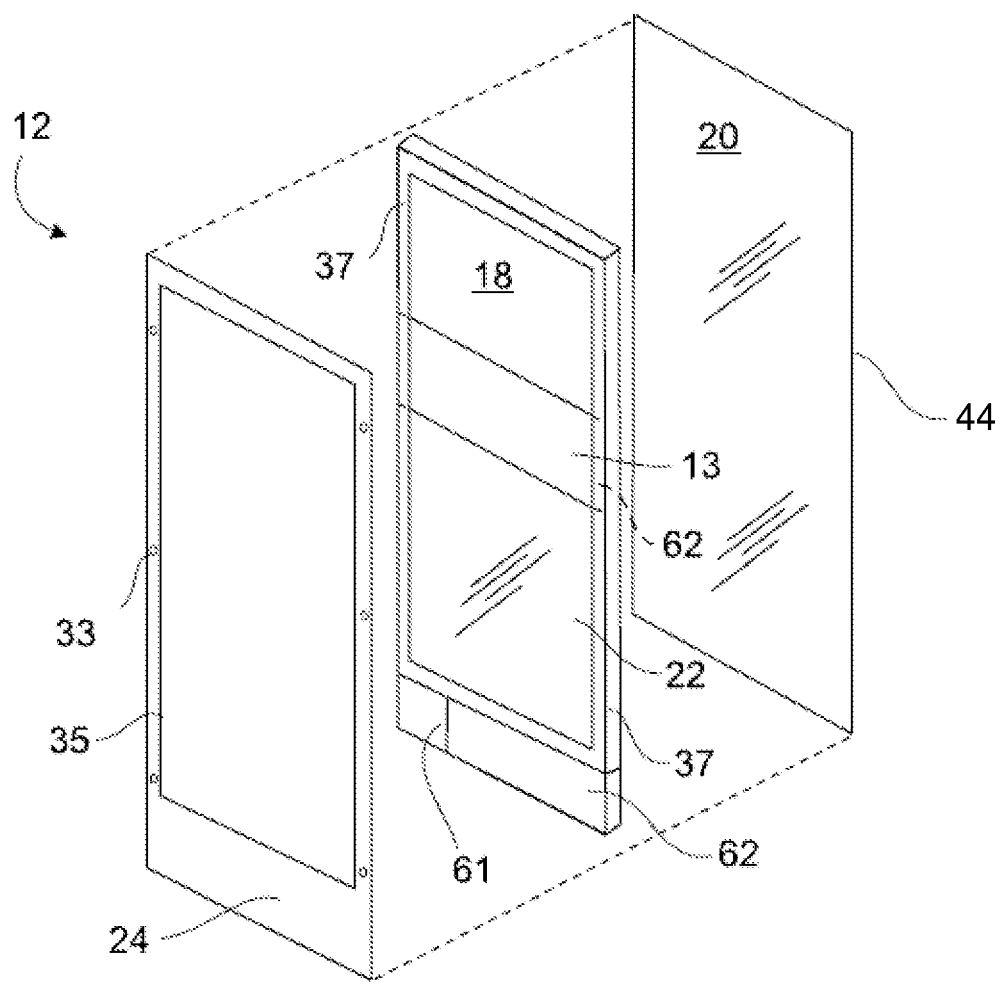
FIG. 3 is a perspective, exploded view of a portion of a display case door according to implementations of the present disclosure.

FIG. 3 depicts an exploded view of display case door 12. For simplicity, the door frame 14 and retainers are not shown. Bezel cover 24 is a thin frame that covers outer housing 37 of electronic display 18. Bezel cover 24 additionally covers computer 61 and housing 62. Bezel cover can have holes 33 that receive mechanical fasteners to attach bezel cover 24 to outer housing 37. Bezel cover 24 has an opening 35 similar in size to the exposed display panel 22 (e.g., screen) of electronic display 18. Electronic display 18 is sandwiched between panel assembly 20 and bezel cover 24. Computer 61 and housing 62 are attached to a bottom end of outer housing 37. Housing 62 can include a case that houses electronic components and/or cables of electronic display 18 and computer 61.

Panel assembly 20 is disposed on a back side of electronic display 18, with a back surface of the panel assembly 20 facing the interior of a refrigerated display case. Panel assembly 20 includes one or more panes (not shown) of transparent or substantially transparent glass, plastics, or other transparent or substantially transparent materials. Panel assembly 20 can include multiple layers of transparent panes. For example, panel assembly 20 can be a multi-pane unit having two panes separated by a gap, forming a sealed glass unit (SGU). Panel assembly 20 can be a vacuum insulated glass (VIG) assembly. For example, a VIG assembly is an SGU in which the sealed space can be an evacuated space below atmospheric pressure.

Figure 4:
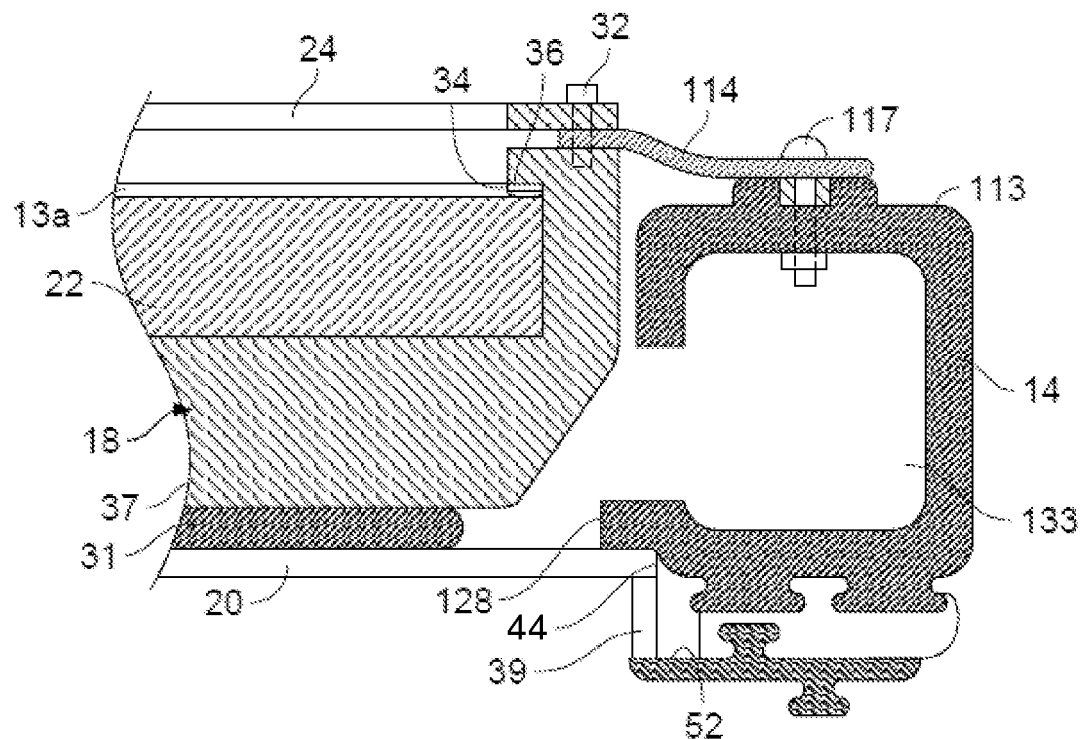
FIG. 4 is a cross-sectional view taken along line 4-4 of a portion of the display case door shown in FIG. 2 according to a first exemplary embodiment.

FIG. 4 is a cross-sectional view taken along line 4-4 of a portion of the display case door 12 shown in FIG. 2. The coupling interface 36 of touch screen 13a is attached to an inner edge of outer housing 37 of electronic display 18, with touch screen 13a overlaying a portion of display panel 22. Coupling interface 36 can include a flat side surface that faces away from panel assembly 20 and is attached to the edge of outer housing 37. An opposite side of coupling interface 26 facing the panel assembly 20 can include a circuit board 34 that is electrically connected to the computer (see FIG. 1). The flat side of the coupling interface 36 can be opaque to cover circuit board 34. Coupling interface 36 can otherwise be attached to display panel 22 (with the circuit board facing away from the panel assembly), or to another surface of electronic display 18. Bezel cover 24 is attached to outer housing 37 with mechanical fasters 32. In some implementations, bezel cover 24 can additionally extend to an edge of door frame 14 to cover a portion or an entire area of door frame 14.

Door frame 14 includes a frame rail 113 and a retainer 114. Frame rail 113 defines a channel 133 that extends along the length of the frame rail 113. Channel 133 can have a channel opening 128 along the length of frame rail 113 that allows power cables (see FIG. 1) to extend away from channel 133 to electronic display 18.

In the example arrangement shown in FIG. 4, retainer 114 can be a door trim that secures electronic displays to door frame 14. Retainer 114 has a first end coupled to frame rail 113 by fastener 117, and an opposite end extending over an edge of electronic display 18 to secure electronic display 18 to door frame 14.

Electronic displays 18 can be positioned directly against the front surface of panel 20. For example, a back surface of outer housing 37 can be sufficiently soft to prevent or reduce scratching of panel 20 when electronic displays 18 come into contact with panel 20. In some implementation, a protecting foam or flexible tape 31 can separate outer housing 37 from front surface 60 of panel 20. Frame rail 113 further includes a channel 52 into which panel assembly 20 is secured to frame 14. Panel assembly 20 can be bonded to frame 14 within channel 52 with an adhesive, such as an epoxy or polyurethane. A spacer 39 or an adhesive such as acrylic can also be used to secure panel 20 to frame 14.

Figure 5:
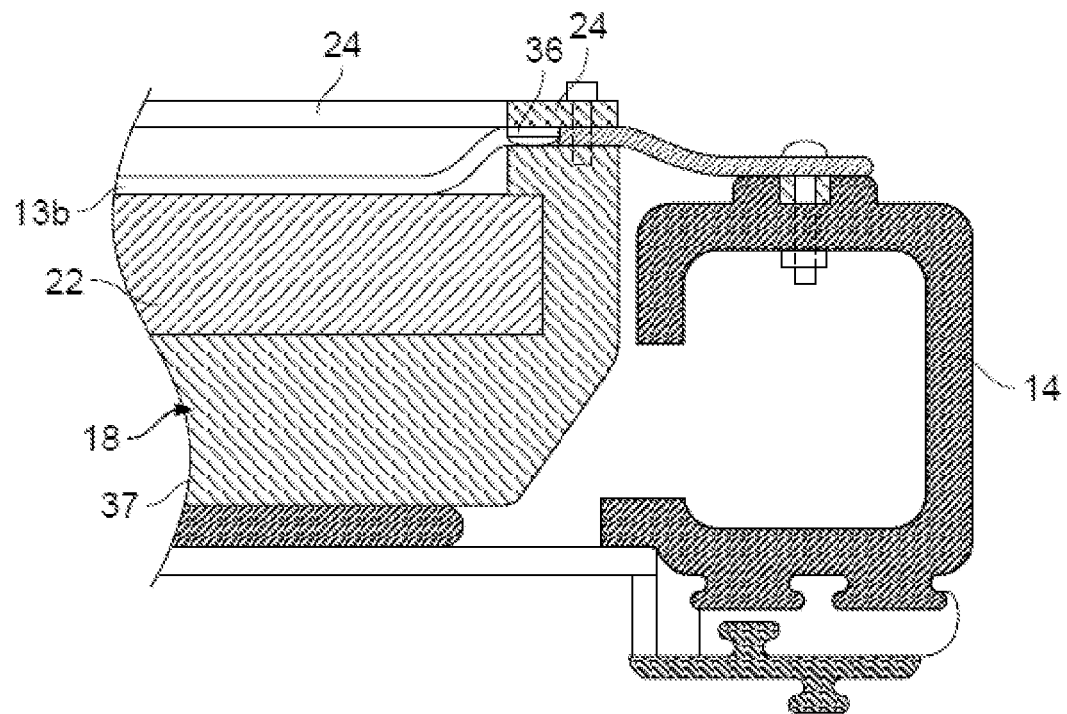
FIG. 5 is a cross-sectional view taken along line 4-4 of a portion of the display case door shown in FIG. 2 according to a second exemplary embodiment.

FIG. 5 illustrates a cross-sectional view of the portion of the display case door shown in FIG. 2, according to another example implementation. In the depicted example, bezel cover 24 includes touch screen 13b. For instance, coupling interface 36 of touch screen 13b is secured to a back surface of bezel cover 24. Coupling interface 36 can be secured to the bezel cover 24 using mechanical fasteners (not shown) or an adhesive.

While a number of examples have been described for illustration purposes, the foregoing description is not intended to limit the scope of the invention, which is defined by the scope of the appended claims. There are and will be other examples and modifications within the scope of the following claims.

What is claimed is:
1. A refrigerated display case door comprising:
   a sealed glass unit comprising a transparent panel assembly;
   a door frame extending about and secured to a peripheral edge of the panel assembly, the door frame configured to be attached to a refrigerated display case;
   a door handle coupled to the door frame;

an opaque electronic display external to the sealed glass unit and overlaying the transparent panel assembly and secured to the door frame; and
a touch screen overlapping a first portion of the electronic display,
wherein the display comprises a second portion which is not overlapped by the touch screen.

2. The display case door of claim 1, wherein the touch screen comprises a capacitive touch screen comprising a coupling interface configured to couple to a portion of the display case door.

3. The display case door of claim 1, wherein the touch screen extends laterally from one vertical edge of the electronic display to another vertical edge of the electronic display across a screen of the electronic display.

4. The display case door of claim 2, further comprising a bezel cover secured to a housing of the electronic display to cover the housing of the electronic display.

5. The display case door of claim 4, wherein the bezel cover comprises the touch screen.

6. The display case door of claim 1, further comprising a computer electrically coupled to the touch screen and electrically coupled to the electronic display, the computer configured to receive and process signals from the touch screen and send instructions associated with the received signals to the electronic display.

7. The display case door of claim 1, further comprising a retainer secured to the door frame and having an end that engages the electronic display to secure the electronic display to the door frame.

8. The display case door of claim 1, further comprising a power cable disposed within a channel in a portion of the door frame to provide electrical power to the electronic display, the door frame comprising a hinge that includes an electrical connector, and the power cable extending away from the hinge through the channel in the portion of the door frame.

9. The refrigerated display case door of claim 1, wherein the touch screen comprises a touch sensor, and the electronic display displays information based on touch input sensed by the touch sensor.

10. The refrigerated display case door of claim 1, wherein the touch screen is external to the electronic display and comprises a coupling interface attached to an inner edge of an outer housing of the electronic display.

11. The refrigerated display case door of claim 10, wherein the coupling interface comprises a circuit board covered by the outer housing and electrically connected to a computer configured to receive and process signals from the touch screen and send instructions associated with the received signals to the electronic display.

12. A refrigerated display case door comprising:
a sealed glass unit comprising a transparent panel assembly;
a door frame extending about and secured to a peripheral edge of the panel assembly, the door frame configured to be attached to a refrigerated display case;
an opaque electronic display external to the sealed glass unit and overlaying the panel assembly and secured to the door frame; and
a localized touch screen overlaying the electronic display and extending laterally from one end of the electronic display to another end of the electronic display and extending vertically over only a portion of the electronic display.

13. The display case door of claim 12, wherein the touch screen comprises a coupling interface configured to couple to a portion of the display case door.

14. The display case door of claim 13, further comprising a bezel cover secured to a housing of the electronic display to cover the housing of the electronic display.

15. The display case door of claim 14, wherein the bezel cover comprises the touch screen.

16. The display case door of claim 12, wherein the touch screen comprises a capacitive touch screen.

17. The display case door of claim 12, further comprising a computer electrically coupled to the touch screen and electrically coupled to the electronic display, the computer configured to receive and process signals from the touch screen and send instructions associated with the received signals to the electronic display.

18. The display case door of claim 12, wherein the localized touch screen is positioned over an upper half of the electronic display.

\* \* \* \* \*